United States Patent
Hennig

(10) Patent No.: US 6,715,800 B1
(45) Date of Patent: Apr. 6, 2004

(54) CLAMPING JOINT

(75) Inventor: Christoph Hennig, Schwabach (DE)

(73) Assignee: I V T Installations- und Verbindungstechnik GmbH & Co KG, Schwabach (DE)

( * ) Notice: Subject to any disclaimer, the term of this patent is extended or adjusted under 35 U.S.C. 154(b) by 0 days.

(21) Appl. No.: 10/130,421

(22) PCT Filed: Oct. 20, 2000

(86) PCT No.: PCT/EP00/10321

§ 371 (c)(1),
(2), (4) Date: Jul. 17, 2002

(87) PCT Pub. No.: WO01/38774

PCT Pub. Date: May 31, 2001

(30) Foreign Application Priority Data

Nov. 20, 1999 (DE) .......................... 199 56 000

(51) Int. Cl.[7] ................................ F16L 33/20
(52) U.S. Cl. ........................ 285/259; 285/256
(58) Field of Search ................ 285/256, 259, 285/255, 257, 258, 242

(56) References Cited

U.S. PATENT DOCUMENTS

| | | | |
|---|---|---|---|
| 1,926,270 A | | 9/1933 | Eastman |
| 1,974,383 A | * | 9/1934 | Wallace .................. 285/258 |
| 2,031,823 A | | 2/1936 | Eastman |
| 2,464,744 A | * | 3/1949 | Fennema ................. 285/330 |
| 2,473,441 A | * | 6/1949 | Muller ..................... 99/500 |
| 2,731,279 A | * | 1/1956 | Main, Jr. .................. 285/95 |
| 3,606,396 A | * | 9/1971 | Prosdocimo ........... 285/148.18 |
| 3,980,325 A | * | 9/1976 | Robertson ................ 285/249 |
| 4,225,162 A | * | 9/1980 | Dola ..................... 285/139.1 |
| 4,577,894 A | * | 3/1986 | Wake ..................... 285/242 |
| 4,605,466 A | * | 8/1986 | Eisenzimmer ............ 156/293 |
| 4,900,068 A | * | 2/1990 | Law ..................... 285/139.2 |
| 5,470,113 A | * | 11/1995 | Schwalm et al. ......... 285/255 |
| 5,498,043 A | * | 3/1996 | Goldenberg .............. 285/242 |
| 6,394,506 B1 | * | 5/2002 | Street ..................... 285/256 |

FOREIGN PATENT DOCUMENTS

| | | |
|---|---|---|
| EP | 0 599 280 A | 6/1994 |
| EP | 0 713 042 A | 5/1996 |

* cited by examiner

*Primary Examiner*—Eric K. Nicholson
(74) *Attorney, Agent, or Firm*—Sughrue Mion, PLLC

(57) ABSTRACT

A clamping joint (fitting) for pipes or hoses of a polymer material or a composite and having a base pipe made of polymer material. The joint includes a cylindrical support sleeve which is provided with several surrounding ribs and is defined by a collar on one end thereof. The collar includes a ring surface which is oriented towards the slip-on end and is situated in a level that is vertical in relation to the cylinder axis. A pipe or hose end having an enlarged cross-section can be slipped-on the remaining end (slip-on end) of the support sleeve. A clamping sleeve is slipped on the pipe or hose, can be displaced and is pushed over the slipped-on pipe or hose end for producing the connection. Webs having the same dimensions are formed to the ring surface. Each web is provided with a planar front face element that is parallel in relation to the ring surface. The front face elements of all the webs are located in a level that is in parallel in relation to the ring surface.

7 Claims, 3 Drawing Sheets

Figure 1:
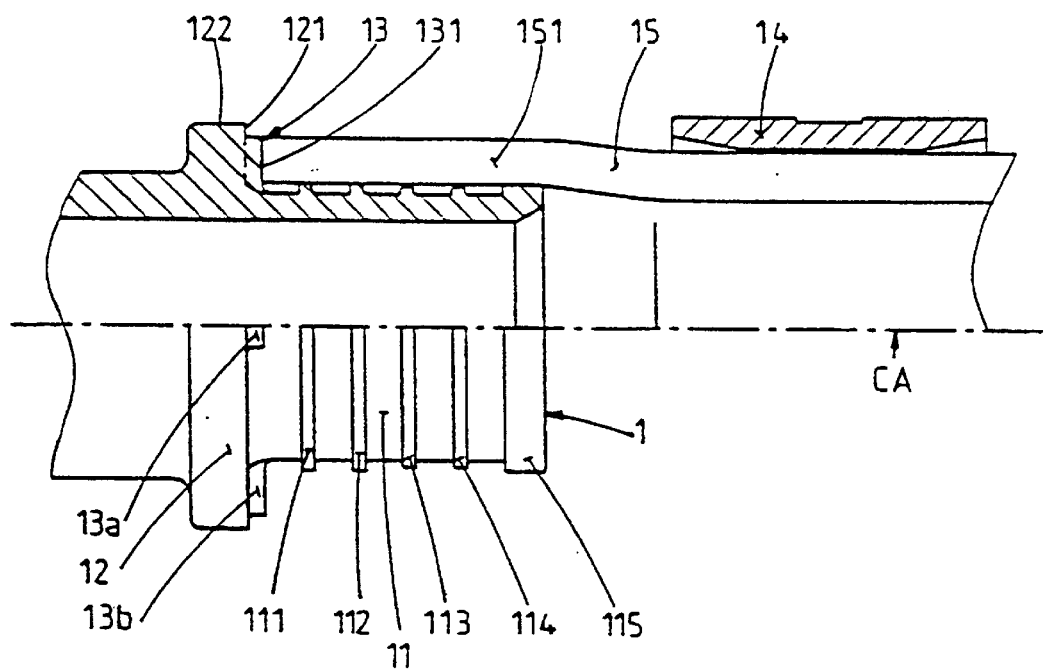

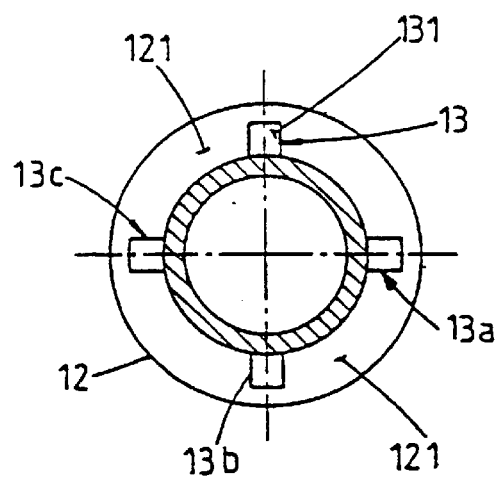
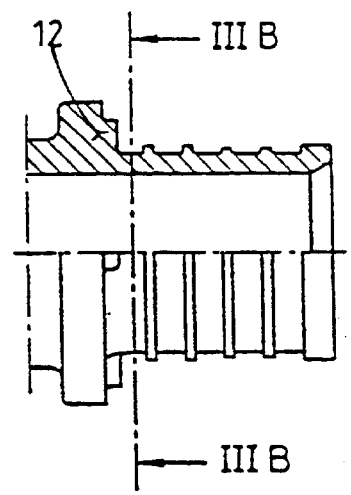
Fig. 3B Fig. 3A
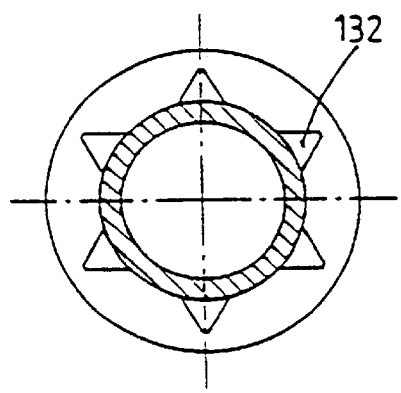
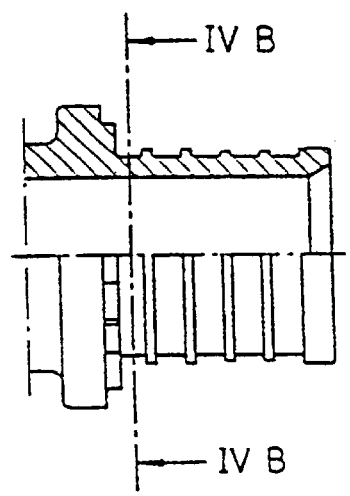
Fig. 4B Fig. 4A

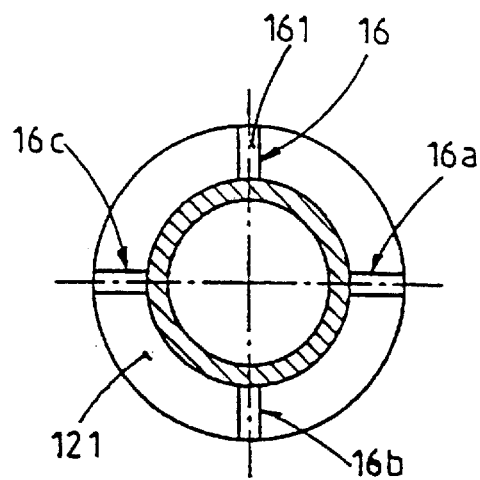
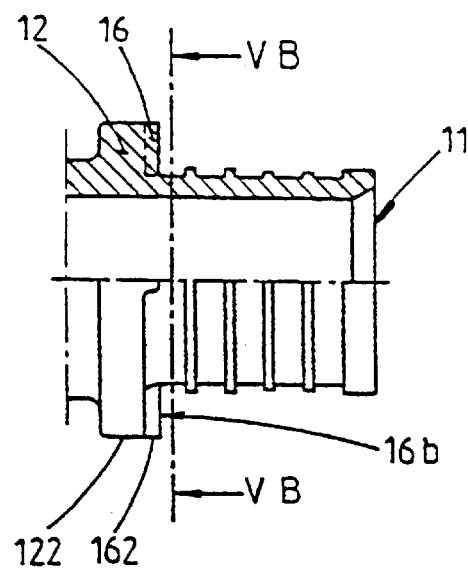
Fig. 5B  Fig. 5A
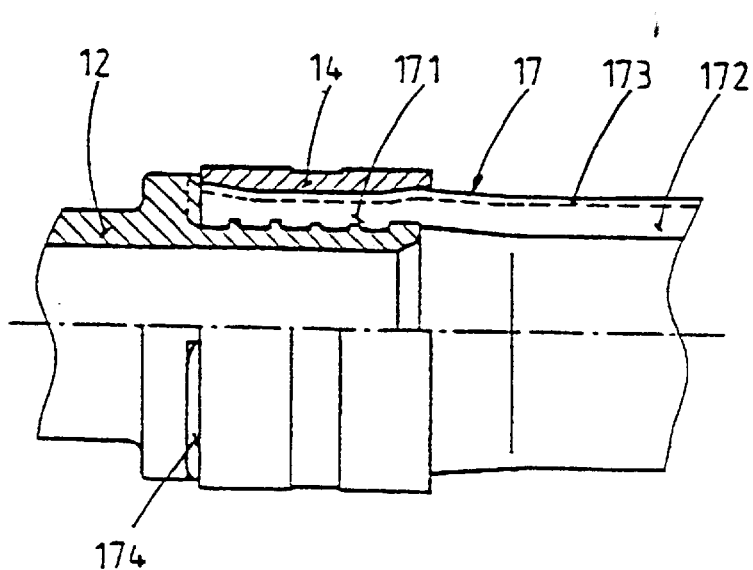
Fig. 5C

CLAMPING JOINT

The invention relates to a clamping joint (fitting) for pipes or hoses of polymer material or of a compound material with a base pipe of polymer material.

A clamping connector according to the general category and with a support sleeve is known from DE 195 14 210 C2 (IVT), the sleeve having several encircling ribs and being bounded at one end thereof by a collar with an annular surface oriented towards the plug-on end, wherein the annular surface lies in a plane perpendicular to the cylinder axis, whilst a pipe end or hose end with a widened cross-section can be plugged onto the other end (plug-on end) of the support sleeve. A displaceable clamping sleeve pushed onto the pipe end or hose end is pressed over the plugged-on pipe end or hose end in order to produce the connection.

The starting point in the case of this clamping connector was that the pipe end clamped in place between the support sleeve and the clamping sleeve does not, as far as possible, find any empty space into which it can deflect. It is thereby ensured that the pressing of the pipe against the ribs or the edges of the ribs is always greater than the internal pressure of the throughflowing medium.

In reality, however, tolerances have to be taken into consideration in the design of the components support sleeve, clamping sleeve and widened pipe end. The "smallest" support sleeve, "largest" clamping sleeve and "thinnest" pipe are to be taken into account. The support sleeve and clamping sleeve are rigid. The pipe end of polymer material or polymer/metal compound material is, in fact, incompressible, but deformable. When the clamping sleeve is pressed on, a part of the excess pipe bulk is forced into the pipe in front of the support sleeve, but the greatest part is piled up in front of the collar. The following disadvantages can result from the piled-up pipe end bulk in front of the collar:

The clamping sleeve cannot be pressed on until abutting the collar, as excess pipe end bulk blocks the way. The intended clamping length between support sleeve and clamping sleeve is thereby not achieved.

The stroke of the pressing tool by which the clamping sleeve is pressed over the pipe is designed so that the clamping sleeve comes into contact with the collar. However, if excess pipe end bulk blocks the way, then a very substantial increase in force through the tool occurs, whereby deformation and/or material damage of the clamping sleeve and/or the collar can happen.

Proposals for the removal of excess pipe end bulk have been made in DE 38 36 124 C2 (Rehau) and DE 295 13 105 U1 (Rehau). The proposals are an annular abutment or web-shaped abutments for the plugged-on pipe end, the height of which in both cases is, however, smaller than the wall thickness of the pipe end. In the case of crosslinked polyethylene (PE-X), which is a particularly suitable material for clamping sleeve connectors, the pipe end widened in socket shape without heating shrinks in an appropriate time onto the support sleeve. When the clamping sleeve is subsequently pressed on, there is then an annular bulging of the excess pipe end bulk over the abutments.

The pressing-on process functions reliably only when the widened pipe end is shrunk onto the support sleeve. In the absence of waiting for complete shrinking on, play is still present between the socket and the support sleeve and the pipe end can be pushed over the abutments by the process of pressing on the clamping sleeve. The pressing on of the clamping sleeve until it abuts the collar is then hardly possible any longer.

The development is directed to the use of compound pipes consisting inter alia of a base pipe of PE-X and an intimately applied sheathing by a metal foil, for example of aluminium. The advantages of compound pipes are: temperature-induced change in length is small, the pipe is stable with respect to sagging between two pipe clamps and a bending of, for example, a permanent 90° deflection is possible. A disadvantage, however, is that a shrinking of the widened pipe end no longer takes place. The known abutments at the support sleeve are not sufficient for pipes of that kind and the pipe end can flow over the abutments. The disadvantages resulting therefrom were described in the foregoing. If the socket of a pipe of compound materials is pressed against the abutments according to DE 38 36 124 or DE 295 13 105, a part of the socket then usually bulges in annular manner over the abutments. This can lead to separation of the layers of the pipe material.

The invention therefore has the object, with respect to a clamping connector according to the general category, of removing, in controlled manner, the excess pipe end bulk occurring in front of the collar.

According to the invention this object is met through design of the clamping connector in accordance with the characterising part of claim 1.

Developments and refinements of the invention are claimed in the subclaims.

Figure 2:
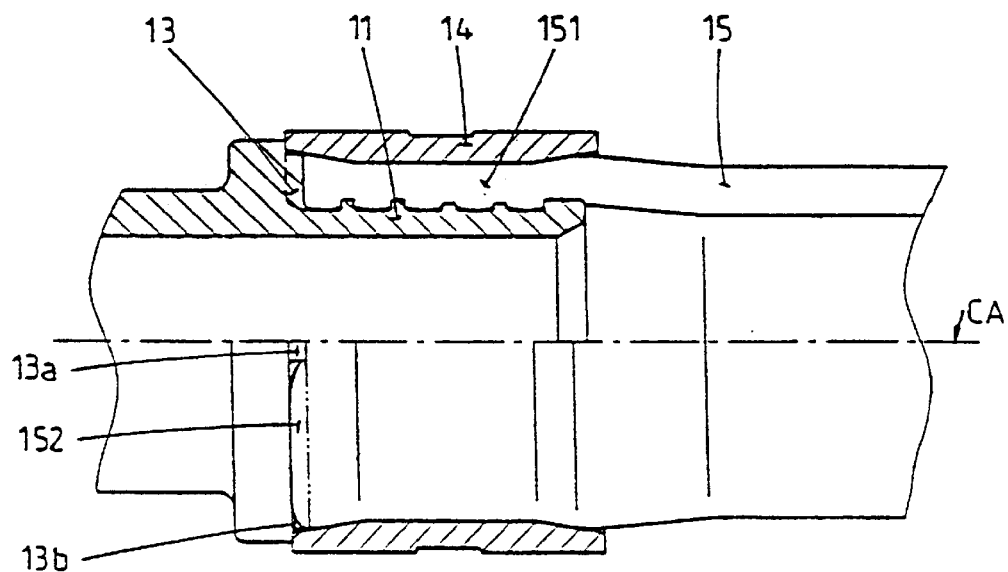

Embodiments of the invention are illustrated in the drawings, in which:

FIG. 1 shows the side view of a support sleeve with a widened pipe end illustrated in section in the upper half, FIG. 2 shows a longitudinal section of the completed clamping connection with a full section in the upper half and a section of the clamping sleeve in the lower half, FIG. 3A shows the half-sectioned side view of the support sleeve according to FIGS. 1 and 2, FIG. 3B shows the view from the direction of the plane IIIB—IIIB of FIG. 3A, FIG. 4A shows the half-sectioned view of a second support sleeve, FIG. 4B shows the view from the direction of the plane IVB—IVB of FIG. 4A, FIG. 5A shows the half-sectioned side view of a third support sleeve, FIG. 5B shows the view from the direction of the plane VB—VB of FIG. 5A and FIG. 5C shows the side view of the completed clamping connection of the third support sleeve according to FIGS. 5A and 5B, with the upper half as a longitudinal section.

The clamping connector 1 for pipes or hoses of polymer material or of a compound material with a base pipe of polymer material, consists of a cylindrical support sleeve 11 which has several encircling ribs 111, 112, 113 and 114 and is bounded at its end by a collar 12 with an annular surface 121 oriented towards the plug-on end. The annular surface 121 lies in a plane perpendicular to the cylinder axis CA. A pipe end or hose end 151 with a widened cross-section is plugged onto the plug-on end of the support sleeve 11. A displaceable clamping sleeve 14 corresponding to FIG. 2 is pressed over the plugged-on pipe end or hose end 151 in order to produce the tight connection between the pipe end or hose end 151 and the support sleeve 11.

Several webs 13, of which the three webs 13, 13a and 13b are illustrated in FIG. 1, are disposed on the annular surface 121. Each web 13 has a planar front face element 131 parallel to the annular surface 121. The front face elements 131 inclusive of webs 13, 13a, 13b and 13c (FIG. 3B) lie in a plane parallel to the annular surface 121. The widened hose end 151 is pushed over the support sleeve 11 until it hits against the front face elements 131. Thereafter the clamping sleeve 14 is pressed over the pipe end or hose end 151 by a tool until the clamping sleeve 14 has adopted the position shown in FIG. 2. In this pressing process the excess pipe or hose material 151 deviates into the spaces between each two webs.

Webs 13 with an approximately rectangular or square front face element 131 are illustrated in FIGS. 3A and 3B. If, however, a collar 12 which is more resistant to bending is needed for the attachment of the tool for pressing the clamping sleeve, then webs 132 with an approximately triangular form can also be used in correspondence with FIGS. 4A and 4B.

The webs 13, 13a, 13b and 13c have a height which corresponds with the outer diameter of the widened pipe end or hose end 151. In FIG. 2 it is illustrated that the excess pipe or hose material 152 is pressed between the webs 13. This means, as illustrated in FIG. 2, that the clamping sleeve 14 can be pressed over the upper edge of the webs 13, 13a, 13b and 13c until abutting the surface 121 of the collar 12. It is thus ensured that no excess pipe or hose material is forced over the webs 13 and prevents abutting of the clamping sleeve 14 with the annular surface 121. A uniform travel and abutting of the clamping sleeve 14 is, however, very important for reducing the forces at the clamping connector 1 and tool for pressing on the clamping sleeve 14.

The use of webs with a prescribed height is, however, problematic in the case of a compound pipe 17 (FIG. 5C) when the pipe or the hose consists of two or more layers. Due to their considerable advantages, compound pipes or hoses 17 consisting of a plastic material inner pipe 172 with a metal sheathing 173, preferably an aluminium sheathing, are used with increasing frequency. If a non-shrinkable compound pipe 17 of that kind with a widened, but equally non-shrinkable, compound pipe end 171 is used, then the risk exists in the pressing-on process of the clamping sleeve 14 and in the case of a small web height, as illustrated in FIGS. 3A to 4B, that the pipe end 171 flows over the webs, the layers 172 and 173 of the pipe 17 are torn away from one another and separated and the advance of the clamping sleeve 14 until abutting the collar 12 is prevented.

A support sleeve 11 with a collar 12 is therefore illustrated in FIGS. 5A, 5B and 5C, at which, for example, four webs 16, 16a, 16b and 16c are disposed, the upper edges 162 of the webs being flush with the outer edge 122 of the collar 12. The front edge of the pipe end or hose end 171 thus also hits against the front face elements 161 of the webs 16 to 16c by its entire front face during the pressing-on process. The risk of an overflow over the webs 16 and a separation of the various layers 172 and 173 of a compound pipe 17 is therefore much smaller than in the case of the webs 13 to 13c according to FIGS. 3A, 3B; 4A, 4B. However, since the clamping sleeve 14 hits against the webs 16, 16a, 16b and 16c as is apparent from FIG. 5C, partial annular gaps continue to exist between the front face of the clamping sleeve 14 and the annular surface 121. The excess pipe or hose material 174 is visible.

| Reference numeral list | |
| --- | --- |
| 1 | clamping connector |
| 11 | support sleeve |
| 111 | rib |
| 112 | rib |

| -continued | |
| --- | --- |
| Reference numeral list | |
| 113 | rib |
| 114 | rib |
| 115 | rib |
| 12 | collar |
| 121 | annular surface |
| 122 | edge of the collar |
| 13 | web |
| 13a | web |
| 13b | web |
| 13c | web |
| 131 | rectangular front face element |
| 132 | triangular front face element |
| 14 | clamping sleeve |
| 15 | pipe or hose |
| 151 | pipe end or hose end |
| 152 | excess pipe or hose material |
| 16 | web |
| 16a | web |
| 16b | web |
| 16c | web |
| 161 | front face element |
| 162 | upper edge of the web |
| 17 | compound pipe |
| 171 | compound pipe end |
| 172 | plastic material inner pipe |
| 173 | metal sheathing |
| 174 | excess compound pipe material |
| CA | cylinder axis |

What is claimed is:

1. A clamping connector for a pipe or hose of polymer material or of a compound material with a base pipe of polymer material, comprising a cylindrical support sleeve which has a plurality of encircling ribs and is bounded at one end thereof by a collar with an annular surface facing the other end of the support sleeve, wherein said annular surface lies in a plane perpendicular to the cylinder axis of the support sleeve and said other end of the support sleeve is insertable into a pipe end or hose end with widened cross-section, and a clamping sleeve which can be displaceably arranged on said pipe or hose and pressed over the pipe end or hose end, when said other end of the support sleeve is inserted therein, to clamp the pipe end or hose end on the support sleeve, the collar being provided on said annular surface thereof with a plurality of webs of the same dimensions, wherein the total volume of the webs is substantially less than the total volume between the webs;
wherein each web has a planar front face parallel to the annular surface and the front faces of all webs are disposed in a plane parallel to the annular surface.

2. A connector according to claim 1, wherein the front face of each web is substantially square.

3. A connector according to claim 1, wherein the front face of each web is substantially rectangular.

4. A connector according to claim 1, wherein the front face of each web is substantially triangular.

5. A connector according to claim 1, wherein the webs are arranged on the annular surface in a symmetrical pattern.

6. A connector according to claim 1, wherein the webs are dimensioned radially of the support sleeve to have radially outer ends lying on a pitch circle with a diameter corresponding to a predetermined inner diameter of said widened cross-section of the pipe end or hose end when said other end of the support sleeve is inserted therein.

7. A connector according to claim 1, wherein the webs have radially outer ends coincident with the periphery of the collar.

* * * * *